(12) United States Patent
Eguchi

(10) Patent No.: US 6,381,447 B1
(45) Date of Patent: Apr. 30, 2002

(54) FOLDABLE MOBILE TELEPHONE

(75) Inventor: Tadashi Eguchi, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/207,197

(22) Filed: Dec. 8, 1998

(30) Foreign Application Priority Data

Dec. 9, 1997 (JP) ............................................. 9-339183

(51) Int. Cl.⁷ ............................................... H04M 1/00
(52) U.S. Cl. ......................... 455/90; 455/575; 455/550; 379/421
(58) Field of Search ............................. 455/90, 89, 550, 455/575, 73–76, 84, 86, 78, 79, 87; 379/433, 428, 422, 421, 434; 367/903

(56) References Cited

U.S. PATENT DOCUMENTS

| | | | |
|---|---|---|---|
| 4,809,355 A | * 2/1989 | Drefahl | ........................ 455/75 |
| 5,335,369 A | * 8/1994 | Aisaka | ........................ 455/116 |
| 5,367,268 A | * 11/1994 | Baba | ............................ 330/129 |
| 5,423,081 A | * 6/1995 | Thiele et al. | ................. 455/116 |
| 5,493,690 A | * 2/1996 | Shimazaki | .................... 379/63 |
| 5,615,259 A | 3/1997 | Gilbert | |
| 5,918,188 A | * 6/1999 | Doran | ........................ 455/575 |
| 5,991,638 A | * 11/1999 | Kim et al. | ................... 455/550 |

FOREIGN PATENT DOCUMENTS

| | | |
|---|---|---|
| EP | 0 607 083 A1 | 1/1994 |
| JP | 62-43940 | 2/1987 |
| JP | 2-177651 | 7/1990 |
| JP | 7-15493 | 1/1995 |
| JP | 7-74691 | 3/1995 |
| JP | 9-247245 | 9/1997 |
| WO | WO 98/15094 | 4/1998 |

* cited by examiner

Primary Examiner—Daniel Hunter
Assistant Examiner—Pablo Tran
(74) Attorney, Agent, or Firm—McGinn&Gibb, PLLC

(57) ABSTRACT

A foldable mobile telephone which is constituted of a main body and a lid being open/close-able and is able to detect open/close state of the lid is provided. The main body provides a receiver for ultrasonic wave and the lid provides a microphone for ultrasonic wave. An ultrasonic oscillator intermittently generates an ultrasonic signal at each fixed interval and gives the ultrasonic signal to the receiver for ultrasonic wave. The receiver for ultrasonic wave receives the ultrasonic signal from the ultrasonic oscillator and generates an ultrasonic wave. The microphone for ultrasonic wave receives the ultrasonic wave generated by the receiver for ultrasonic wave and generates an ultrasonic detecting signal. An ultrasonic level judging circuit receives the ultrasonic detecting signal from the microphone for ultrasonic wave and judges whether the level of this ultrasonic detecting signal is higher or lower than a decided level and judges the open/close state of the lid and generates a judging signal. With this construction, the detecting the open/close state of the lid becomes possible and the ultrasonic wave is applied for this constitution, therefore the outside magnetic field does not influence this operation.

18 Claims, 4 Drawing Sheets

FOLDABLE MOBILE TELEPHONE

BACKGROUND OF THE INVENTION

The present invention relates to a foldable mobile telephone which is constituted of a main body and an open/close-able lid and in particular is capable of detecting the open/close state of the lid.

DESCRIPTION OF THE RELATED

As a conventional foldable mobile telephone, the Japanese Patent Laid-Open Publication No. HEI 7-15493 discloses the foldable mobile telephone which is constituted of a main body provided a magnet, a lid had a lead switch and a detecting circuit detecting the on/off state of the lead switch.

However, in the conventional foldable mobile telephone, the relationship the position of the magnet and the lead switch is important, therefore the mounting condition at the manufacturing process to be satisfied with this relation of the position is a burden. Moreover, the conventional foldable mobile telephone has a problem that the lead switch acts erroneously influenced by the outside magnetic field. Furthermore, the conventional foldable mobile telephone has a problem that the magnetic field of the magnet may influence magnetic recording devices such as a magnetic card.

SUMMARY OF THE INVENTION

It is therefore an object of the present invention to provide a foldable mobile telephone whose mounting condition during the manufacturing process is not critical and is not erroneously influenced by the outside magnetic field and does not influence badly the magnetic recording devices such as a magnetic card.

According to a first aspect of the present invention, to solve the above mentioned problems, at a foldable mobile telephone which is constituted of a main body and a lid being open/close-able for said main body, the present invention provides a receiver for ultrasonic wave provided in said main body, a microphone for ultrasonic wave provided in said lid, an ultrasonic oscillator for giving an ultrasonic signal to said receiver for ultrasonic wave and an open/close state judging means for judging the open/close state of the lid by judging whether the level of an ultrasonic detecting signal is higher or lower than a decided level receiving the ultrasonic detecting signal from said microphone for ultrasonic wave.

According to a second aspect of the present invention, at a foldable mobile telephone which is constituted of a main body and a lid being open/close-able for said main body, the present invention provides a microphone for ultrasonic wave provided in said main body, a receiver for ultrasonic wave provided in said lid, an ultrasonic oscillator for giving an ultrasonic signal to said receiver for ultrasonic wave, and an open/close state judging means for judging the open/close state of the lid by judging whether the level of an ultrasonic detecting signal is higher or lower than a decided level receiving the ultrasonic detecting signal from said microphone for ultrasonic wave.

According to a third aspect of the present invention, at a foldable mobile telephone which is constituted of a main body and a lid being open/close-able for said main body, the present invention provides a microphone for ultrasonic wave provided in said main body, a receiver for ultrasonic wave provided in said lid, an ultrasonic oscillator for intermittently giving an ultrasonic signal at each fixed interval to said receiver for ultrasonic wave, an open/close state judging signal generating means for generating the open/close state judging signal judged the open/close state of the lid by judging whether the level of an ultrasonic detecting signal is higher or lower than a decided level receiving the ultrasonic detecting signal from said microphone for ultrasonic wave, and a judged result memory means for memorizing the judged result of said open/close state judging signal from said open/close state judging signal generating means.

According to a fourth aspect of the present invention, at a foldable mobile telephone which is constituted of a main body and a lid being open/close-able for said main body, the present invention provides a receiver for ultrasonic wave provided in said main body, a microphone for ultrasonic wave provided in said lid, an ultrasonic oscillator for intermittently giving an ultrasonic signal at each fixed time to said receiver for ultrasonic wave, an open/close state judging signal generating means for generating the open/close state judging signal judged the open/close state of the lid by judging whether the level of an ultrasonic detecting signal is higher or lower than a decided level receiving the ultrasonic detecting signal from said microphone for ultrasonic wave, and a judged result memory means for memorizing the judged result of said open/close state judging signal from said open/close state judging signal generating means.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
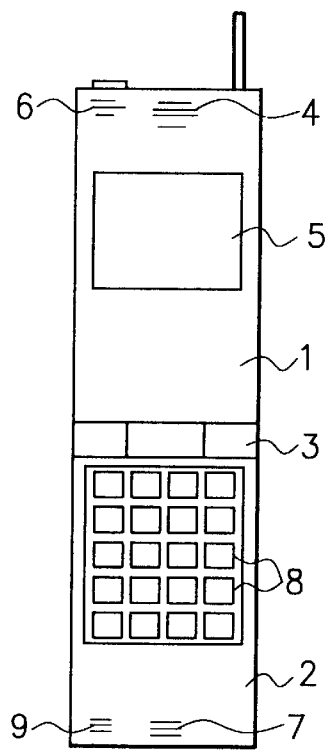
FIG. 1 is a front view of an embodiment of a foldable mobile telephone of the present invention.

Referring now to the drawings, embodiments of the present invention are explained in detail. FIG. 1 is a front view of an embodiment of a foldable mobile telephone of the present invention and FIG. 2 is a side view of the embodiment of the foldable mobile telephone of the present invention.

Figure 2:
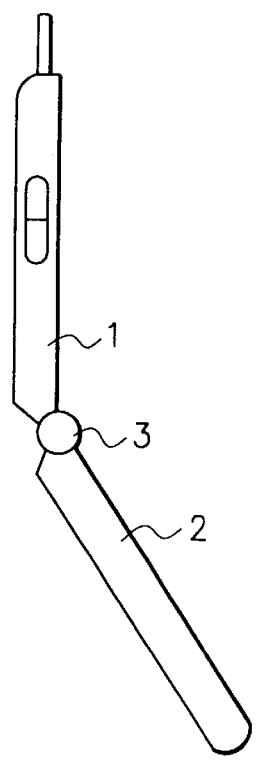
FIG. 2 is a side view of the embodiment of the foldable mobile telephone of the present invention.

In FIGS. 1 and 2, the foldable mobile telephone of the present invention is constituted of a main body 1 and an open/close-able lid 2 for this main body. The open/close-able lid 2 is connected to the main body 1 by a hinge 3 in an open/close-able state. The main body 1 provides a receiver 4, a display 5, a receiver for ultrasonic wave 6 and so forth. The open/close-able lid 2 provides a microphone 7, plural operation keys 8, a microphone for ultrasonic wave 9 and so forth.

Figure 5:
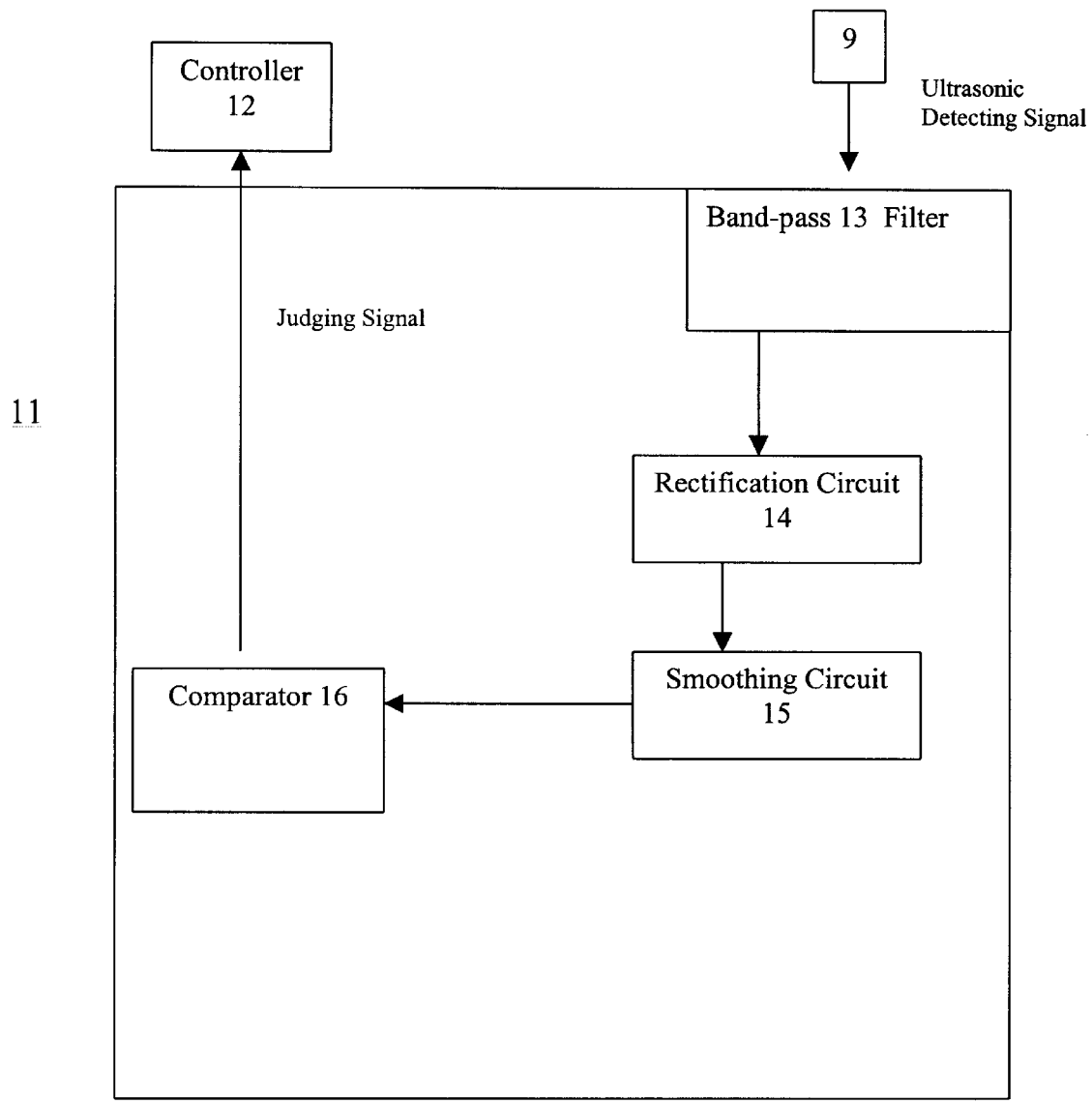
FIG. 5 is a block diagram showing a brand-pass filter, a retification circuit, a smoothing circuit, and a comparator of the present invention.

FIG. 5 is a block diagram showing a band-pass filter, a rectification circuit, a smoothing circuit, and a comparator of the present invention. Both the main body 1 and the open/close-able lid 2 provide a device detecting the open/close state of the open/close-able lid 2.

Figure 3:
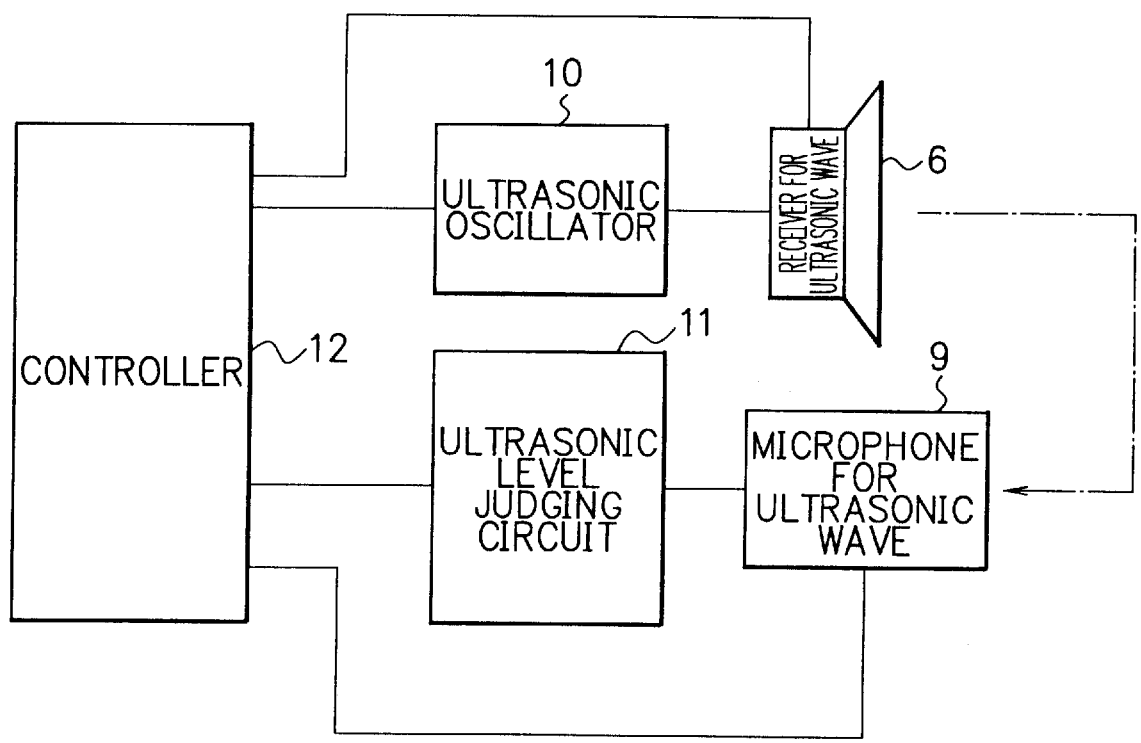
FIG. 3 is a block diagram showing an important part of the embodiment of the foldable mobile telephone of the present invention.

FIG. 3 is a block diagram showing an important part of the embodiment of the foldable mobile telephone of the present invention. The receiver for ultrasonic wave 6 is connected to an ultrasonic oscillator 10. The microphone for ultrasonic wave 9 is connected to an ultrasonic level judging circuit 11. These ultrasonic oscillator 10 and ultrasonic level judging circuit 11 are connected to a controller 12. The receiver for ultrasonic wave 6 and the microphone for ultrasonic wave 9 are also connected to the controller 12.

The ultrasonic oscillator 10 intermittently generates an ultrasonic signal in a fixed interval and gives the signal to the receiver for ultrasonic wave 6. The ultrasonic oscillator 10 generates an ultrasonic signal, for example about 40 kHz being outside the audio frequency. At the time when the receiver for ultrasonic wave 6 receives the ultrasonic signal from the ultrasonic oscillator 10, the receiver for ultrasonic wave 6 responds to this ultrasonic signal and generates an ultrasonic wave. The microphone for ultrasonic wave 9 generates an ultrasonic detecting signal when the microphone for ultrasonic wave 9 receives the ultrasonic wave generated by the receiver for ultrasonic wave 6. The ultrasonic level judging circuit 11 receives the ultrasonic detecting signal from the microphone for ultrasonic wave 9 and judges whether the level is higher or lower than the decided level and generates a judging signal to judge whether the lid 2 is opened or closed. For example, the ultrasonic level judging circuit 11 judges the lid 2 is opened at the case that the level of the ultrasonic detecting signal is lower than the decided level and outputs the high level judging signal, and judges the lid 2 is closed at the case that the level of the ultrasonic detecting signal is higher than the decided level and outputs the low level judging signal.

The ultrasonic level judging circuit 11, as shown in FIG. 5, includes a band-pass filter 13 which receives the ultrasonic detecting signal from the microphone for ultrasonic wave 9 and detects the frequency of a specific ultrasonic wave, a rectification circuit 14 which rectifies this output of the band-pass filter, a smoothing circuit 15 for smoothing the output of the rectification circuit and a comparator 16 which judges whether this output level of the smoothing circuit 15 is higher or lower than a decided level and generates the judging signal and gives this judging signal to the controller 12. The decided level, at the foldable mobile telephone, at the time when the distance between the receiver for ultrasonic wave 6 and the microphone for ultrasonic wave 9 is a half distance of the full open state of the lid 2, is set to the output level of the smoothing circuit 15 of the ultrasonic level judging circuit 11 for the specific ultrasonic wave outputted by the ultrasonic receiver 6.

The controller 12 after receiving and storing the judging signal from the ultrasonic level judging circuit 11 stops the operation of the receiver for ultrasonic wave 6, the ultrasonic oscillator 10, the microphone for ultrasonic wave 9 and the ultrasonic level judging circuit 11. That is, the controller 12, to lessen the power consumption, intermittently drives the receiver for ultrasonic wave 6, the ultrasonic oscillator 10, the microphone for ultrasonic wave 9 and the ultrasonic level judging circuit 11 at only needed time. Moreover, the controller 12 compares the level of the memorized existing ultrasonic level judging signal with the level of the ultrasonic level judging signal received right before the memorized existing one, and at the case that the level of the ultrasonic level judging signal is changed, the operation of changing time of the level is implemented.

Figure 4:
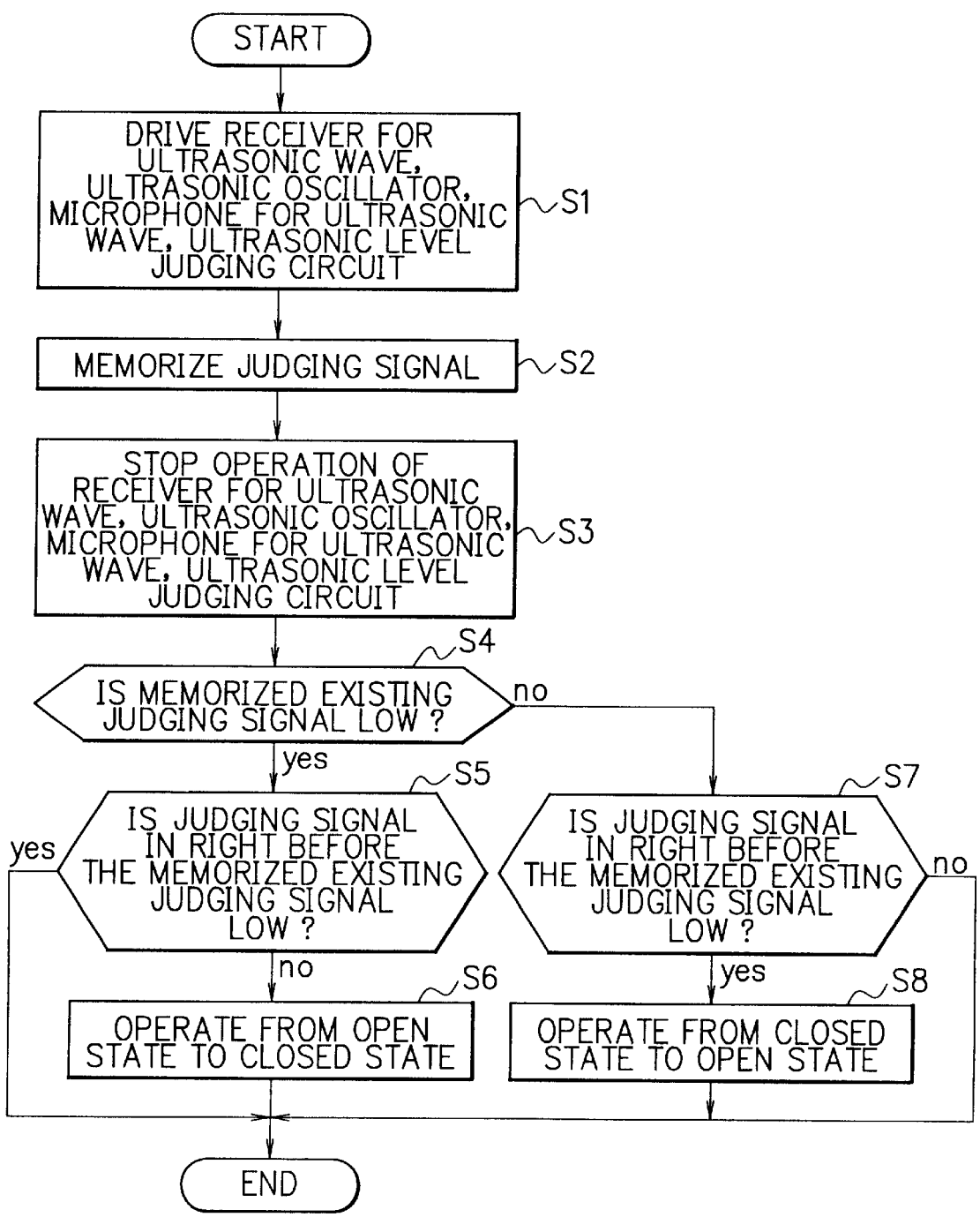
FIG. 4 is a flowchart showing the operation of the embodiment of the foldable mobile telephone of the present invention.

FIG. 4 is a flowchart showing the operation of the embodiment of the foldable mobile telephone of the present invention. The controller 12 drives the receiver for ultrasonic wave 6, the ultrasonic oscillator 10, the microphone for ultrasonic wave 9 and the ultrasonic level judging circuit 11 (step S1). Next, the controller 12 receives and memorizes the judging signal from the ultrasonic level judging circuit 11 (step S2). After this step, the controller 12 stops the operation of the receiver for ultrasonic wave 6, the ultrasonic oscillator 10, the microphone for ultrasonic wave 9 and the ultrasonic level judging circuit 11 (step S3).

The controller 12 judges whether the memorized existing judging signal is a low level or not (step S4). At the time when the memorized existing judging signal is the low level (yes of step S4), the controller 12 judges whether the judging signal in right before the stored existing judging signal is a low level or not (step S5). At the time when the judging signal in right before the stored existing judging signal is not the low level (no of step S5), the controller 12 implements the operation that the lid 2 changes from the open state to the closed state (step S6). This operation is that the display 5 is switched off, the back-light of the display is switched off and the foldable mobile telephone becomes the waiting state of call and so forth. At the time when the judging signal in right before the stored existing judging signal is the low level (yes of step S5), the controller 12 judges the lid 2 is at the closed state, the operation of the controller 12 is stopped.

At the time when the stored existing judging signal is not the low level (no of step S4), the controller 12 judges whether the judging signal in right before the stored existing judging signal is the low level or not (step S7). At the time when the judging signal in right before the stored existing judging signal is the low level (yes of step S7), the controller 12 implements the operation that the lid 2 changes from the closed state to the open state (step S8). This operation is that the display 5 is switched on, the back-light of the display is switched on and the foldable mobile telephone becomes the receiving state of call and so forth. At the time when the judging signal in right before the stored existing judging signal is not the low level (no of step S7), the controller 12 judges the lid is at the open state, the controller 12 stops the operation.

In the above mentioned embodiment, the receiver 4 is usable as the receiver for ultrasonic wave 6 and the microphone 7 is also usable as the microphone for ultrasonic wave 9. The receiver for ultrasonic wave 6 is able to be installed in the lid 2 and the microphone for ultrasonic wave 9 is able to be installed in the main body 1. Moreover, the controller 12, at the time the power is on, may always drive the receiver for ultrasonic wave 6, the ultrasonic oscillator 10, the microphone for ultrasonic wave 9 and the ultrasonic level judging circuit 11. At this case, the controller 12 intermittently memorizes the judging signal from the ultrasonic level judging circuit 11 at each fixed time.

The foldable mobile telephone of the present invention detects the open/close state of the lid 2 for the main body 1 utilizing that the level of the ultrasonic detecting signal changes depending on the distance from the receiver for ultrasonic wave 6 to the microphone for ultrasonic wave therefore the mounting condition at the manufacturing process is not severe.

The foldable mobile telephone of the present invention does not use a magnetic device to detect the open/close state of the lid 2 for the main body 1, and therefore the error operation influenced from the outside magnetic field does not occur.

Moreover, the foldable mobile telephone of the present invention does not use a magnetic device to detect the open/close state of the lid 2 for the main body 1, and therefore the bad effect for the magnetic recording devices such as a magnetic card does not occur.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A foldable mobile telephone which includes a main body and a lid being open/close-able for said main body, comprising:
    a receiver for ultrasonic wave provided in said main body;
    a microphone for ultrasonic wave provided in said lid;
    an ultrasonic oscillator for providing an ultrasonic signal to said receiver for said ultrasonic wave; and
    open/close state judging means for judging the open/close state of the lid by judging whether the level of an ultrasonic detecting signal received from said microphone is higher or lower than a decided level,
    wherein said decided level comprises a stored level of an ultrasonic detecting signal received from said microphone prior to said ultrasonic signal being provided to said receiver.

2. The foldable mobile telephone in accordance with claim 1, wherein said microphone comprises a microphone of said foldable mobile telephone, and
    wherein said receiver comprises a receiver of said foldable mobile telephone.

3. The foldable mobile telephone, as claimed in claim 1, wherein said open/close state judging means comprises a band-pass filter for receiving said ultrasonic detecting signal from said microphone, and detecting a frequency of a specific ultrasonic wave, a rectification circuit for rectifying an output of the band-pass filter, a smoothing circuit for smoothing an output of the rectification circuit, and a comparator for judging whether said output level of the smoothing circuit is higher or lower than said decided level, and generating a judging signal.

4. The foldable mobile telephone, as claimed in claim 1, wherein said decided level corresponds to an ultrasonic wave generated by the receiver at a time when a distance between the receiver and the microphone comprises a predetermined distance.

5. The foldable mobile telephone, as claimed in claim 1, further comprising:
    a controller connected to said open/close state judging means, said ultrasonic oscillator, said receiver, and said microphone.

6. The foldable mobile telephone, as claimed in claim 5, wherein said controller receives and stores a judging signal output from said open/close state judging means and stops an operation of said receiver, said microphone, said oscillator, and said open/close state judging means.

7. The foldable mobile telephone, as claimed in claim 5, wherein said controller receives a judging signal output from said open/close state judging means and compares said received judging signal to a stored judging signal received earlier than said received judging signal.

8. The foldable mobile telephone, as claimed in claim 7, wherein said controller switches said telephone to an open state from a closed state when said stored signal has a high level and said received judging signal has a low level, and wherein said controller switches said telephone to a closed state from an open state when said stored signal has a low level and said received judging signal has a high level.

9. The foldable mobile telephone, as claimed in claim 8, further comprising a display, a back-light, and a call receiving mode,
    wherein in said open state, said display is on, said back-light is on, and said call receiving mode is on, and
    wherein in said closed state, said display is off, said back-light is off, and said call receiving mode is off.

10. A foldable mobile telephone which includes a main body and a lid being open/close-able for said main body, comprising:
    a microphone for ultrasonic wave provided in said main body;
    a receiver for ultrasonic wave provided in said lid;
    an ultrasonic oscillator for providing an ultrasonic signal to said receiver for ultrasonic wave; and
    open/close state judging means for judging the open/close state of the lid by judging whether the level of an ultrasonic detecting signal received from said microphone is higher or lower than a decided level,
    wherein said decided level comprises a stored level of an ultrasonic detecting signal received from said microphone prior to said ultrasonic signal being provided to said receiver.

11. The foldable mobile telephone, as claimed in claim 10, wherein said open/close state judging means comprises a band-pass filter for receiving said ultrasonic detecting signal from said microphone and detecting a frequency of a specific ultrasonic wave, a rectification circuit for rectifying the output of the band-pass filter, a smoothing circuit for smoothing the output of the rectification circuit, and a comparator for judging whether said output level of the smoothing circuit is higher or lower than said decided level and generating a judging signal.

12. A foldable mobile telephone which includes a main body and a lid being open/close-able for said main body, comprising:
    a microphone for ultrasonic wave provided in said main body;
    a receiver for ultrasonic wave provided in said lid;
    an ultrasonic oscillator for intermittently providing an ultrasonic signal at a fixed interval to said receiver for ultrasonic wave;
    open/close state judging signal generating means for generating the open/close state judging signal indicating the open/close state of the lid by judging whether the level of an ultrasonic detecting signal received from said microphone is higher or lower than a decided level; and
    judged result memory means for storing the judged result of said open/close state judging signal generated from said open/close state judging signal generating means,
    wherein said decided level comprises a stored level of an ultrasonic detecting signal received from said microphone prior to said ultrasonic signal being provided to said receiver.

13. The foldable mobile telephone in accordance with claim 12, wherein
    said microphone comprises a microphone of said foldable mobile telephone, and wherein said receiver comprises a receiver of said foldable mobile telephone.

14. The foldable mobile telephone, as claimed in claim 12, wherein said judged result memory means stops an operation of said receiver, said microphone, said oscillator, and said open/close state judging signal generating means.

15. The foldable mobile telephone, as claimed in claim 12, wherein said judged result memory means compares said judged result to a stored judged result received earlier than said judged result.

16. A foldable mobile telephone which includes a main body and a lid being open/closeable for said main body, comprising:

a receiver for ultrasonic wave provided in said main body;

a microphone for ultrasonic wave provided in said lid;

an ultrasonic oscillator for intermittently providing an ultrasonic signal at a fixed time to said receiver;

open/close state judging signal generating means for generating the open/close state judging signal indicating the open/close state of the lid by judging whether the level of an ultrasonic detecting signal received from said microphone is higher or lower than a decided level; and judged result memory means for storing the judged result of said open/close state judging signal generated from said open/close state judging signal generating means, wherein said decided level comprises a stored level of an ultrasonic detecting signal received from said microphone prior to said ultrasonic signal being provided to said receiver.

17. The foldable mobile telephone, as claimed in claim 16, wherein said judged result memory means stops an operation of said receiver, said microphone, said oscillator, and said open/close state judging means.

18. The foldable mobile telephone, as claimed in claim 16, wherein said judged result memory means compares said judged result to a stored judged result received earlier than said judged result.

* * * * *